United States Patent [19]

Francia

[11] 4,220,140

[45] Sep. 2, 1980

[54] SOLAR RECEIVER

[76] Inventor: Giovanni Francia, Via Casaregis 34/12, Genoa, Italy

[21] Appl. No.: 881,856

[22] Filed: Feb. 27, 1978

Related U.S. Application Data

[63] Continuation-in-part of Ser. No. 629,674, Nov. 6, 1975, abandoned.

[30] Foreign Application Priority Data

Nov. 22, 1974 [IT] Italy .............................. 13055 A/74

[51] Int. Cl.² .............................................. F24J 3/02
[52] U.S. Cl. .................................. 126/446; 126/450; 126/438
[58] Field of Search ............... 126/270, 271, 424, 438, 126/442, 446, 450; 237/1 A

[56] References Cited

U.S. PATENT DOCUMENTS

| | | | |
|---|---|---|---|
| 1,661,473 | 3/1928 | Goddard | 126/271 |
| 3,208,447 | 9/1965 | Laszlo | 126/270 |
| 3,299,881 | 1/1967 | Koch | 126/271 |
| 3,924,604 | 12/1975 | Anderson | 126/270 |

Primary Examiner—Carroll B. Dority, Jr.
Assistant Examiner—Lee E. Barrett
Attorney, Agent, or Firm—Robert E. Burns; Emmanuel J. Lobato; Bruce L. Adams

[57] ABSTRACT

The invention provides a solar receiver able to transform the incident solar energy into a thermal energy for heating a suitable fluid up to the temperatures required by the present thermoelectric plants and water dissociation processes.

7 Claims, 10 Drawing Figures

SOLAR RECEIVER

This is a continuation-in-part application of my application, Ser. No. 629,674 filed Nov. 6, 1975 and now abandoned.

BACKGROUND OF THE INVENTION

The possibilities of exploiting solar energy for producing on an industrial scale the high quality energies required by the present technologies, like electric energy or hydrogen, are connected to the embodiment of processes of direct, photovoltaic or photochemical conversion, or to the transformation of solar energy into thermal energy at the high temperatures required by the present thermoelectric plants and water dissociation processes.

As it is known, the operative temperature of a solar energy collector is the one at which the sum of the energy lost by radiation, conduction and convection matches the difference between the incident energy absorbed by the collector and the used energy, the sum of the losses being an increasing function of the temperature. Therefore, in order to increase the operative temperature of a solar energy collector, the yielding remaining equal, there are three possibilities:

(1) to increase the quantity of incident solar energy;
(2) to increase the coefficient of absorption of solar energy by the collector;
(3) to reduce the losses.

The increase of the solar energy incident on the collector may be obtained by concentrating onto its surface, through lenses or mirrors, the energy incident on a larger surface. The use of lenses is restricted to plants of small size, while for plants of larger size and power only mirror systems are used.

The solar receiver of the present invention may be coupled to any of the concentrating systems up to now known, e.g. a concentration system consisting of a plurality of movable mirrors, each of which is moved in such a way as to reflect in any moment the solar rays incident thereon to the direction of the solar receiver stationary in the space.

A concentration system of this kind was suggested by the owner of the Italian Pat. No. 756,844 of Apr. 10, 1965 and its first addition No. 833,428 of Mar. 21, 1967.

The increase of the incident solar energy may be thus obtained by means of a structure (concentration system) arranged outside the solar receiver. On the contrary, the increase of the absorption coefficient and the reduction of the losses may be obtained only by acting on the characteristics of the solar receiver and the material used for the construction thereof.

It is now very important to emphasize that the more is increased the quantity of solar energy absorbed through the receiver opening the more is increased the efficiency of the device admitted the remaining features of it are not changed.

That has clearly been showed by my studies, as you can see in "Atti dei Convegni Lincei" 1975, Rome, n. 7, proceedings of an international meeting about the best use and the economy of natural resources.

You can then easily conceive how important is for a solar receiver to get the lowest value of the reflection coefficient. Till now, only one method is used to improve the receiver capability of absorbing the solar radiation, i.e. black paintings high temperature proof. Unfortunately, these paintings are not lasting and hence are not useful when we operate for considerable time periods. The device I'm going to propose is on the contrary free from similar limitations because it employs an optical instead of a chemical method. In fact, it improves the absorption coefficient not increasing the rate between energy absorbed and reflected in a single reflection, rather multiplying the number of subsequent reflections of the same ray, leaving the surface natural reflection coefficient almost unchanged. Of course, this method can't work on the diffused fraction of the not absorbed energy. This fraction is not, however, very important being the metal surface of the pipe very well polished according to our description in the following. After 3 reflections it is allowed seized the 99.2% of the reflected energy when the reflection coefficient is as high as 0.8.

In addition to the action aiming to get a better absorption, the second way to improve a receiver efficiency is the lowering of the losses. At present, there are three reliable methods to accomplish this purpose:

(a) Greenhouse effect
(b) Antiirradiating structures
(c) Selective paintings.

The first one is not employable when the receiver dimensions grow large and the concentration rate is high, because of mechanical and thermical reasons. The second is difficult to use in cavity receiver due to the complexities in the surfaces involved, while the third, besides being not steady at high temperature, have strong reducing effects on the most important absorbing capability of the receiver. The device I'm proposing gets the losses reduction shielding the hot pipes making the highest layers by the cold ones in the lowest layers. In this way, the infrared radiation reemitted by the hot pipes is absorbed by the cold ones and don't come outside. Besides, the hot pipes are shielded from the incoming directed rays avoiding dangerous hot spots susceptibles to crack the pipe and hence the whole receiver. Furthermore, for reducing the remaining losses caused by ventilation effects, a series of quartz or pyrex tubes is placed among the pipes in the receiver. These pipes, approaching a honeycomb structure, have still a favourable effect raising the absorbing coefficient and lowering the infrared emission outside the cavity.

OBJECT OF THE INVENTION

In view of the foregoing, the invention aims at providing a solar receiver having an overall absorptivity coefficient of the incident solar energy even much higher than the one of the materials used for its construction. That is achieved through a suitable planning and sizing of the various parts the receiver consists of, and, according to the present invention, through both a suitable arrangement of the pipes passed through by the fluid to be heated and suitable characteristics of the outer surface of said tubes. Therefore, it is possible to provide a solar receiver having a high absorptivity coefficient of solar energy, by using conventional materials, like stainless steel, for its construction.

Another purpose of the present invention is to provide a solar receiver having an overall emissivity coefficient for the radiant energy emitted by the pipes and casing structures at their normal operation temperatures, even much lower than the one of the materials used for its construction. That is achieved, according to the present invention, through both a suitable arrangement of the pipes passed through by the fluid to be heated, and the use of special structures in form of honeycomb, consisting of tubes, parallel to one another, made of a material transparent to the solar energy and absorbent to the radiant energy of longer wavelength emitted by the pipes and by internal casing structures at their normal operation temperatures, like glass, quartz and the materials commercially known as pyrex. It is important to note that the geometrical arrangement of the pipes inside the receiver allowing a low emissivity coefficient for the infrared radiant energy, is not in opposition to and may even coincide with the one allowing a high absorptivity coefficient of solar energy entering the casing opening.

SUMMARY OF THE INVENTION

One of the constructive arrangements used according to the present invention for achieving the desired results consists of controlling all the trajectories of the incident light so that they cannot pass outwardly again through the casing opening before being subject to the highest possible number of reflections or portions of the solar receiver like the pipes, the supports thereof and the casing walls.

That requires two arrangements, first of all it is necessary to treat the surfaces of the solar receiver parts hit by the incident light so as to reduce to a minimum the quantity of diffused light on which obviously no control may be exerted, and that may be reached by polishing the surfaces. Then, it is necessary to profile said surfaces and direct them so that the rays reflected therefrom may strike other parts of the solar receiver. By these arrangements, if e.g. materials with a low absorption coefficient like 0.5 are used and the solar receiver is realized in such a way that a light ray is subject to four reflections on an average before being reflected outside the solar receiver, the latter will have an overall absorption coefficient up to $1-0.5^4=0.9375$.

Circular section pipes with adequate wall thickness are normally used for high pressure-high temperature steam. By using such pipes in a solar receiver, the most part of the solar energy hitting the pipes and reflected passes again through the opening after only one reflection. According to the present invention, the circular section pipes to be used in a solar receiver will be provided with triangular section wings or ribs having on their outer edge an acute angle. Said wings or ribs are to be so oriented that the part of the incident solar energy which is reflected has a direction such as to meet other pipes or internal casing structures. The outer surfaces both of the pipes and of the wings or ribs will be polished to reduce the part of the incident solar energy which is diffused.

Said wings or ribs can be arranged on the pipes longitudinally referring to the pipe axis as well as in helicoidal form around the pipes. The last arrangement can be easily obtained by threading the pipes with a triangular section thread.

Another constructive arrangement according to the present invention consists of getting the pipes, passed through by the fluid to be heated, on planes parallel to one another and to the plane of the casing opening. All the pipe portions arranged on the same plane are connected together. Then, each pipe system placed on one plane is connected in series to the pipe systems placed on the adjacent planes. Finally, the whole pipe system is connected to a feed pump or other suitable means for circulating the fluid to be heated inside the pipes to a prefixed direction. Said connection is such that the cold fluid coming from the feed pump passes first through the pipes placed on the plane nearest the opening plane, and, then, through the pipes placed on the planes at increasing distances from the opening plane. So, the pipe portions at higher temperatures are the farthest ones from the opening, and the infrared radiant energy they emit towards the opening is partially blocked by the pipe portions at lower temperatures placed on planes closer to the opening plane, and, therefore, it is partially recovered.

That allows a substantial reduction of the energy losses due to reirradiation. Therefore, according to the present invention, it is possible to provide a solar receiver with reduced losses of radiant energy by using conventional materials and without any need of using materials with selective optical characteristics—i.e. high absorptivity in the visible and low emissivity in the infrared—which are difficult to be obtained and expensive, for operation temperatures of 400° to 600° C. or more.

The arrangement of the pipes on planes parallel to the plane of the casing opening, allows a good utilization of anti-irradiating structures. These structures have roughly the form of honeycomb and may consist of tubes, bundled parallel to one another, made of materials like glass, quartz and that material commercially known as pyrex, transparent to solar energy and absorbent to radiant energy emitted, with a longer wavelength, by the pipes and the internal structures of the casing.

According to the present invention, at least one of the spaces comprised between two planes on which the pipes are placed, or between one of these planes and the plane of the opening, includes a honeycomb anti-irradiating structure. In such a way, a further reduction in energy lost by reirradiation is obtained.

BRIEF DESCRIPTION OF THE DRAWINGS

In order that the invention may be clearly understood, it will be now described, by way of example, with reference to the accompanying drawings, wherein.

DESCRIPTION OF A PREFERRED EMBDODIMENT

Figure 1:
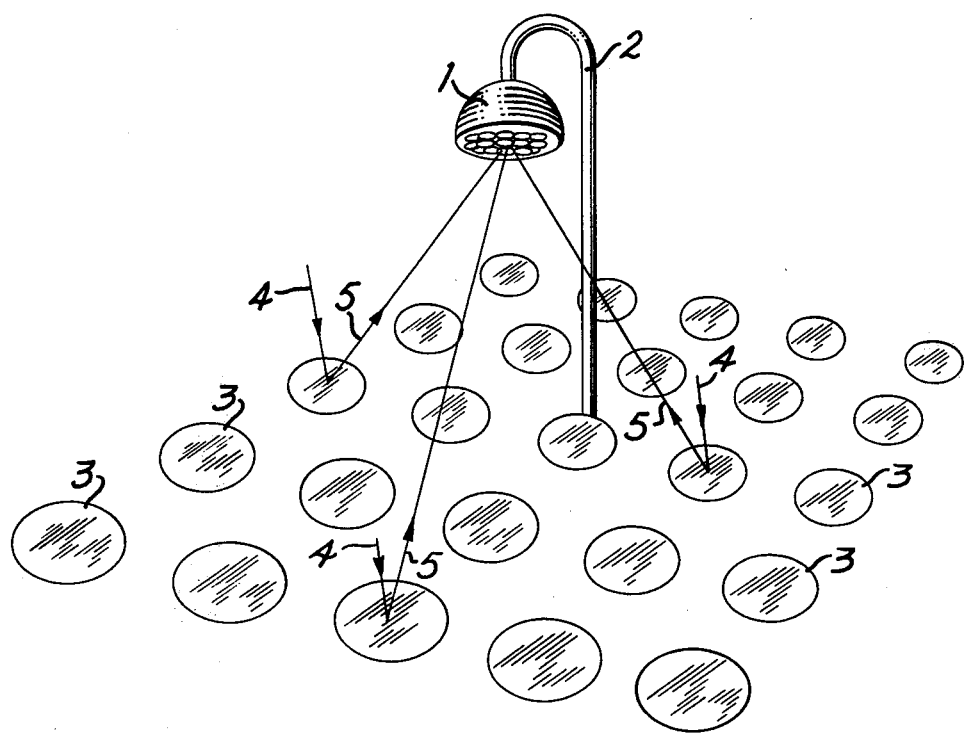
FIG. 1 is a diagrammatic perspective view of a solar receiver according to the invention and of a mirror concentration system.

In FIG. 1, numeral 1 denotes a solar receiver suspended, through a support 2, above a concentration system consisting of a plurality of mirrors 3.

Each mirror is moved in such a way that, at any moment, the incident solar rays 4 are reflected in the direction 5 of the receiver.

The control mechanism for the movement of mirrors 3 may be of any conventional type and is not shown in the drawings.

Figure 2A:
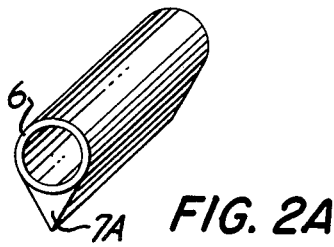
FIGS. 2A, 2B are diagrammatic views of different possible sections and shapes of the pipes to be used in a solar receiver according to the invention.
Figure 2B:
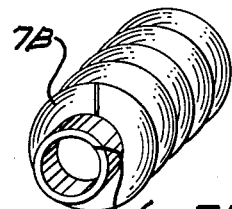
Figure 2B:
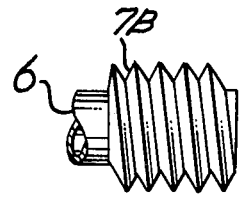

FIGS. 2A, 2B show two of the possible shapes and sections of pipe to be used in a solar receiver, having—according to the invention—the property that, when suitably arranged and directed, they reflect the incident solar rays in such a direction as to hit other pipes or internal receiver structures.

FIG. 2A shows a circular section pipe 6 provided with a longitudinal wing 7A of triangular section. FIG. 2B shows a circular section pipe 6 provided with a triangular section wing 7B arranged according to a cylindrical spiral. This can be easily obtained by threading the outer surface of the pipe with a triangular section thread.

Figure 2C:
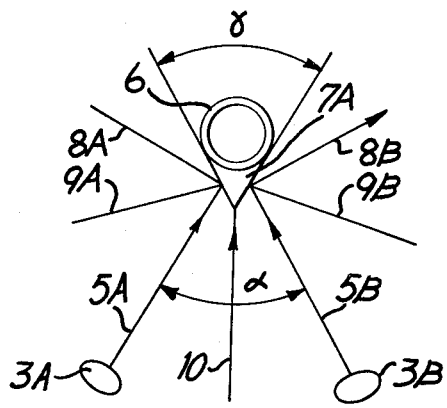
FIG. 2C is an indicative diagram showing the geometrical properties which the pipes shown in the preceding figures must have.

FIG. 2C is intended to show the geometrical properties which the pipes shown in FIGS. 2A, 2B must have, and specially the conditions concerning the value of the angles formed in the wing edges the pipes, according to said figures, are provided with. FIG. 2C relates to a pipe like the one shown in FIG. 2A, but the results may be readily transferred to the general case. In FIG. 2C, 6 denotes a circular section pipe provided with a triangular section longitudinal wing 7A; 3A and 3B denote two mirrors of the concentration system used, selected in such a way that the angle $\alpha$ formed by the two rays 5A and 5B reflected by said mirrors on the pipe concerned may be the largest one among all those formed by the similar rays reflected by any pair of mirrors 3; 8A and 8B denote the rays obtained by the reflection of 5A, 5B on the outer surfaces of said wing 7A; 9A and 9B denote the normals to said surfaces; 10 denotes the direction along which is obtained the highest value of the flux of the solar energy incident on the pipe; $\gamma$ denotes the angle at the edge of the triangular wing 7A. The direction 10 will be, for symmetry reasons, near the bisector of angle $\alpha$ and, according to the present invention, coincident with the bisector of angle $\gamma$.

The condition intended, i.e. that the reflected rays 8A, 8B have a direction such as to meet other pipes or receiver parts, may be translated into the condition that they form with direction 10 an angle remarkably lower than a right angle, e.g. not larger than the two thirds of a right angle. Considering the known laws on reflection, such a condition is written:

$$2\gamma + \alpha \leq \tfrac{2}{3}\pi$$

FIGS. 3A, 3B, 3C, 3D show some of the possible arrangements of the pipes in a solar receiver according to the invention.

Figure 3A:
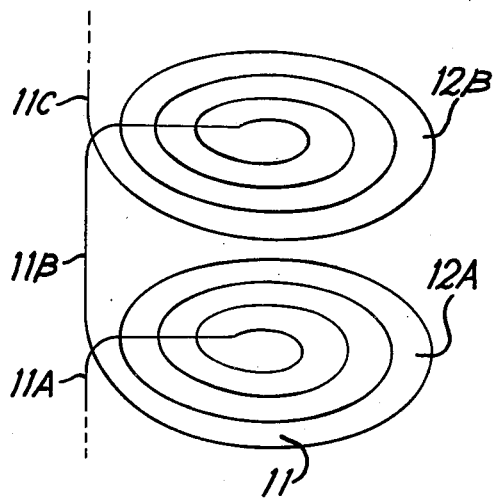
FIGS. 3A, 3B, 3C, 3D are diagrammatic views of different possible arrangements of the pipes inside a solar receiver according to the invention.

FIG. 3A shows a pipe 11 arranged according to spirals 12A, 12B, each spiral being placed on a plane parallel to the plane of the opening and being connected through pipe portions 11A, 11B, 11C to the spirals placed on adjacent planes.

Figure 3B:
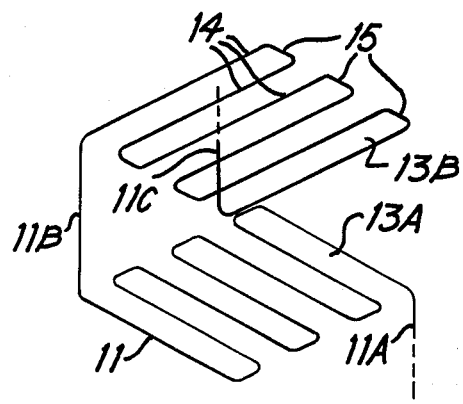

FIG. 3B shows a pipe 11 arranged according to coils 13A, 13B, each coil being placed on a plane parallel to the plane of the opening and being connected through pipe portions 11A, 11B, 11C to the spirals placed on adjacent planes. Each coil consists of straight segments 14 connected in series through pipe fittings 15.

Figure 3C:
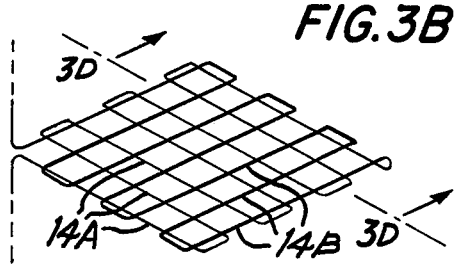

FIG. 3C shows a pipe 11 arranged according to two strictly adjacent coils having the relevant straight segments 14A, 14B perpendicular to one another.

Figure 3D:
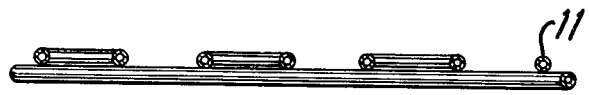

FIG. 3D is a section of the arrangement shown in FIG. 3C according to a plane passing through the A—A line and perpendicular to the plane of the coils.

Figure 4:
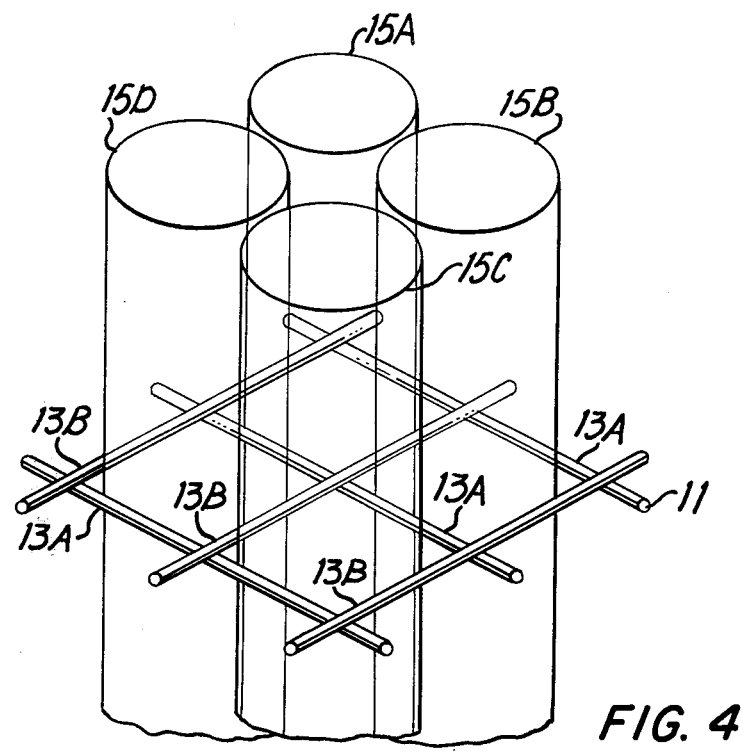
FIG. 4 is a diagrammatic view of one of the possible arrangements of an anti-irradiating honeycomb structure in a solar receiver according to the invention.

FIG. 4 shows one of the possible arrangements of a honeycomb anti-irradiating structure in a solar receiver according to the invention. FIG. 4 relates to a geometrical arrangement of the pipes like the one shown in FIG. 3C, but the results may be transferred to the other possible pipe arrangements. In FIG. 4, 15A, 15B, 15C, 15D denote tubes made of a material transparent for the solar energy and absorbent for the infrared radiant energy, like glass, quartz, and that material commercially known as pyrex. Said tubes are arranged with their axis parallel to one another like in a honeycomb structure. The special anti-irradiating properties of such a structure were exposed by the inventor in Rome, during a Meeting on the new sources of energy organized by U.N.O. on 1961. Each tube 15 passes through the grid formed by the two coils 13A, 13B according to which the pipe 11 is arranged.

Figure 5:
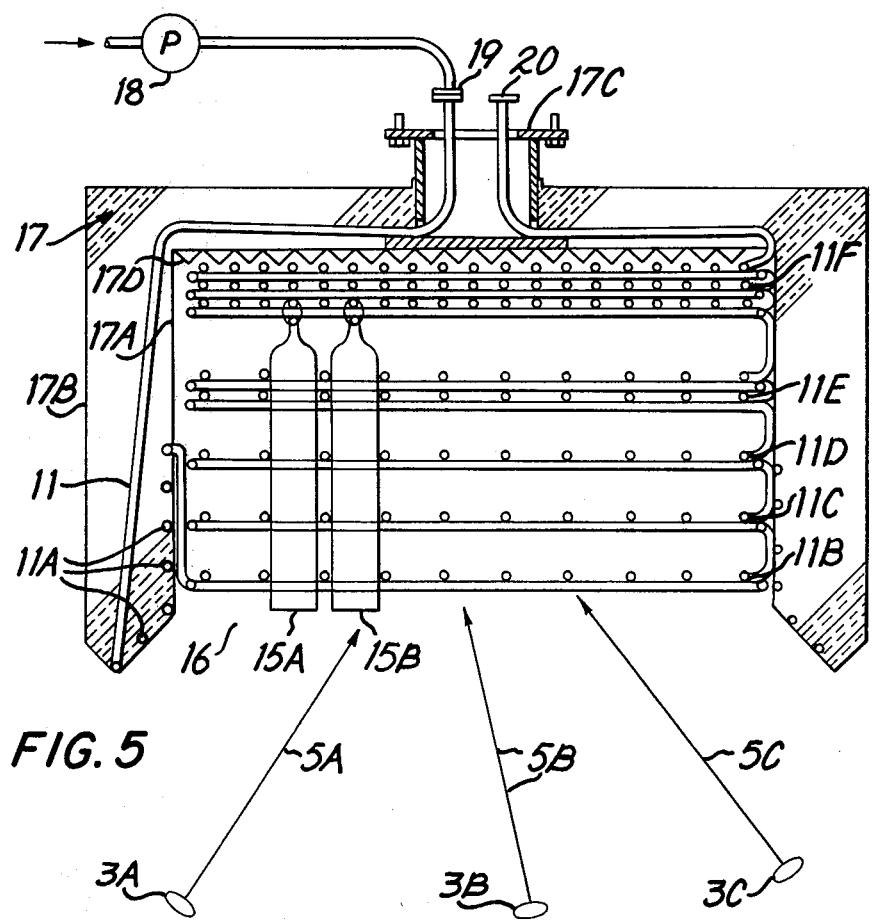
FIG. 5 is a section along the line passing through the axis of a solar receiver according to the invention.

FIG. 5 shows in section according to a plane passing through the axis of the receiver, one of the possible embodiments of a solar receiver according to the invention. In FIG. 5, 16 denotes the opening through which the solar energy enters the receiver; 3A, 3B, 3C denote three mirrors of the concentration system used; 5A, 5B, 5C denote the solar rays reflected by said mirrors into the opening 16; 17 denotes the casing of the receiver, consisting of an internal casing 17A and an external casing 17B. The receiver casing 17 is provided with adequate means 17C to be supported above the concentration system. The cavity comprised between the internal casing 17A and the external casing 17B is filled with a thermally insulating material.

The outer surface of the external casing 17B must be protected against too high flux of the incident solar energy which can occur in case of misalignment during the aiming procedure of the mirrors 3. This protection can be obtained through conventional means, e.g. by using ceramic coating.

The inner surface of the internal casing 17A is polished, according to the invention, for reducing the part of the not absorbed incident solar energy which is diffused. The top portion 17D of said inner surface of the internal casing 17A is shaped in form of pyramids having the edge towards the opening 16, for reducing the part of the not absorbed incident solar energy which is reflected through the opening 16.

The fluid to be heated passes through the pipe 11. Different fluids can be used, e.g. water, air, sodium, organic liquids, etc. The pipe must be like the ones shown in FIGS. 2A, 2B.

A feed pump 18 is provided for circulating the fluid to be heated through the pipe 11 to a prefixed direction. The cold fluid coming from the pump 18 enters the pipe 11 at the pipe inlet 19 and passes first through a pipe portion 11A arranged on, and in thermal contact with the outer surface of that part of the internal casing 17A nearest to the opening 16. This allows an adequate cooling of said part of the internal casing 17A, also in case of misalignment or during the aiming procedure of the mirrors 3.

The fluid to be heated passes then, according to the invention, through the pipe portions 11B, 11C, 11D, 11E, 11F, arranged on planes parallel to the plane of the opening 16. The pipe portions 11B, 11C, 11D, 11E, 11F, are so connected that the fluid passes through them at increasing distances from the opening 16. Each pipe portion 11B, 11C, 11D, 11E, 11F, is arranged on a plane in such a way that at least one pair of coils are laid with the straight segments perpendicular to one another. Moreover, all the arrangements shown in FIGS. 2 can be used.

The hot fluid coming from the pipe portions 11F, goes out of the receiver through the pipe outlet 20 and can be supplied to the user system, which can be a conventional one, like a turbine, a heat exchanger, etc.

In FIG. 5, 15A, 15B denote two tubes, made of a material transparent for the solar energy and absorbent for the infrared radiant energy, like glass, quartz, and that material commercially known as pyrex. The tubes 15 are arranged inside the receiver, according to the invention, in form of honeycomb. Each tube 15A, 15B passes through the spaces comprised between straight segments of the pipes 11B, 11C, 11D, 11E, and is closed at its upper end in order to allow to be easily supported. The tubes 15 are supported by the pipes 11F.

It is understood that the invention is not limited to the examples shown. It is intended to cover all modifications and equivalents within the scope of the appended claims.

What I claim is:

1. A solar receiver having one or more pipes suitable to be passed through by a fluid to be heated, i.e. suitable for circulating said fluid inside said pipe or pipes to a prefixed direction, a casing having an opening, said pipe or pipes being arranged and supported within said casing provided with said opening shaped and directed in such a way as to collect incident solar energy said casing being for the remaining portion, closed and thermally insulated, wherein said pipe or pipes are substantially arranged in layers parallel to the plane of the casing opening through which the solar energy passes, and the fluid to be heated flows through the pipes in the first layer and then on the next ones above going upwards from the plane of the casing opening, so that the pipe portions passed through by the fluid at higher temperatures are shaded by the pipe portions passed through by the fluid at lower temperatures and the solar energy flux incident on the pipe portions passed through by the fluid at higher temperature does not exceed a previously stated limit value, the pipe or pipes passed through by the fluid to be heated having substantially triangular section wings or ribs having on their outer edge an acute angle, said wings or ribs having the outer surface polished so that the portion of the not absorbed incident solar energy which is diffused becomes neglectable, and being so oriented that the not absorbed incident solar energy is reflected to a direction such as to meet other pipes.

2. A solar receiver, according to claim 1, wherein said wings or ribs are longitudinally arranged with respect to pipe axis and are so oriented to have the outer edge towards the casing opening.

3. A solar receiver, according to claim 1, wherein said wings or ribs are arranged around the pipe or pipes in helicoidal shape.

4. A solar receiver, according to claim 1, wherein the layers of pipes placed on each plane parallel to the plane of the casing opening are arranged according to a spiral.

5. A solar receiver, according to claim 1, wherein the layers of pipes placed on each plane parallel to the plane of the casing opening are arranged in a coil shape consisting of straight parallel pipe segment.

6. A solar receiver, according to claim 5, wherein two coils connected in series are placed in grate shaped layers parallel to the plane of the casing opening.

7. A solar receiver, according to claim 1, wherein at least one of the spaces comprised between two of the layers in which the pipe or pipes are arranged, or between one of these layers and the plane of the casing opening, includes parallel tubes disposed to form a structure like a honeycomb, and said tubes being made of a material transparent to the solar energy and absorbent of the radiant energy of longer wavelength emitted by the pipe or pipes and by the internal casing structures, and consisting of glass or quartz, or pyrex.

* * * * *